O. PRATT.
Fastening the Ends of Band Saws.
No. 201,444. Patented March 19, 1878.
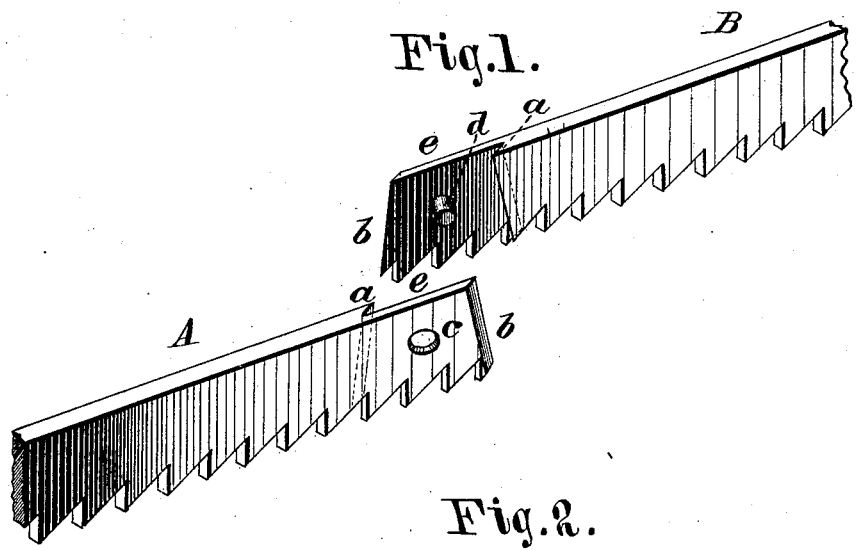
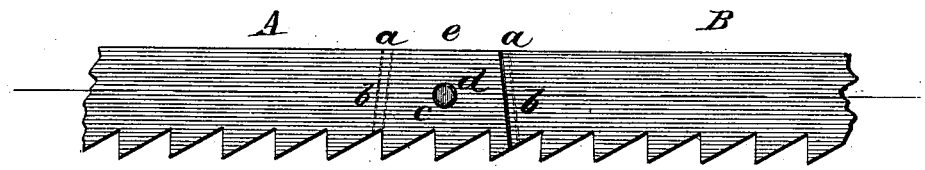
Witnesses:
P. C. Dieterich
Frank H. Duffy
Inventor:
Orvin Pratt.
Per C. H. Watson & Co. Attorneys.

UNITED STATES PATENT OFFICE.

ORRIN PRATT, OF NORTHAMPTON, MASSACHUSETTS, ASSIGNOR TO E. M. WRIGHT, OF GENEVA, NEW YORK.

IMPROVEMENT IN FASTENING THE ENDS OF BAND-SAWS.

Specification forming part of Letters Patent No. 201,444, dated March 19, 1878; application filed February 11, 1878.

*To all whom it may concern:*

Be it known that I, ORRIN PRATT, of Northampton, in the county of Hampshire and State of Massachusetts, have invented certain new and useful Improvements in Fastening the Ends of Band-Saws; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to an improvement in the manner of securing or fastening the two opposite ends of a band-saw together; and it consists in the construction of parts, as will be hereinafter more fully set forth.

In the annexed drawings, Figure 1 is a perspective. Fig. 2 is a side elevation, and Fig. 3 is a longitudinal section.

A and B represent the two opposite ends of a band-saw, having a portion, $e\,e$, cut away to about half its thickness. The rear of this cut-away portion, or that part of the same nearest the body of the saw, is provided on either end with undercut shoulders $a\,a$, cut at opposite angles. The extreme ends of the cut-away portions are provided with angular bevels $b\,b$. The cut-away portion on the end B is provided with an undercut pin, $d$, and the end A is provided with a beveled opening, $c$, to admit of the reception of the pin $d$.

The operation is as follows: The end A is placed crosswise upon the end B at the cut-away portion, the opening $c$ receiving the pin $d$. The ends are then turned in opposite directions until the beveled ends $b$ engage with the undercut shoulders $a$, which hold the ends firmly, preventing lateral motion, and the pin $d$ preventing longitudinal motion.

By this means a simple and cheap mode of fastening is provided, and one that is not liable to get out of repair, and one that can be attached or detached, at will; and by my means of forming a smooth and even fastening, there are no projections left on the side of the saw to catch in the material and damage the same.

The pin $d$ is provided on one side with an undercut portion, and the opening $c$ with a corresponding bevel, so that when the two ends are turned in place the undercut portion of the pin engages with the bevel in the opening $c$, and assists in preventing any lateral motion.

Having thus fully described the invention, what I claim as new, and desire to secure by Letters Patent, is—

The cut-away portions $e$, provided with beveled ends $b\,b$, undercut shoulders $a\,a$, opening $c$, and pin $d$, for the purpose set forth.

In testimony that I claim the foregoing as my own I have hereto affixed my signature in presence of two witnesses.

ORRIN PRATT.

Witnesses:
SAMUEL W. LEE, Jr.,
WILLIE JAGER.